Dec. 10, 1963 D. H. BUTLER 3,113,402
SLAB CONSTRUCTION
Filed Dec. 9, 1960 6 Sheets-Sheet 1

INVENTOR.
Donald H. Butler
BY
HIS ATTORNEYS

INVENTOR.
Donald H. Butler
BY
HIS ATTORNEYS

Dec. 10, 1963 D. H. BUTLER 3,113,402
SLAB CONSTRUCTION
Filed Dec. 9, 1960 6 Sheets-Sheet 3

INVENTOR.
Donald H. Butler
BY
HIS ATTORNEYS

Dec. 10, 1963 D. H. BUTLER 3,113,402
SLAB CONSTRUCTION
Filed Dec. 9, 1960 6 Sheets-Sheet 4

INVENTOR.
Donald H. Butler
BY
HIS ATTORNEYS

INVENTOR.
Donald H. Butler

BY
Webb Mackey & Burden
HIS ATTORNEYS

INVENTOR.
Donald H. Butler

BY
HIS ATTORNEYS

United States Patent Office 3,113,402
Patented Dec. 10, 1963

3,113,402
SLAB CONSTRUCTION
Donald H. Butler, R.D. 2, Allison Park, Pa.
Filed Dec. 9, 1960, Ser. No. 74,913
3 Claims. (Cl. 50—531)

This invention relates to cast slab-type floors and ceilings, particularly reinforced concrete floor slabs especially useful for low cost housing construction.

Ordinarily, in the production of cast floor slabs, temporary forms are employed which have to be shored up to withstand the load of the wet concrete until it sets. The forms are heavy to withstand the load, and the shoring requires extensive time and labor to set up and remove after the concrete has set. In some instances, concrete slabs are poured over a fill of drainage material or over a combination of drainage material and insulating material over the drainage fill, and such construction usually requires a vapor barrier of some type.

One of the principal objects of the invention is to provide a combined casting form and cast floor slab which unifies as a single slab structure after casting and which at no times requires the temporary forms. Another object is to eliminate the temporary shoring up of some types of slab constructions. Another object is to provide a self-contained concrete form from which the tendency to sag is materially reduced or largely eliminated, so as to prevent bellying and a consequent waste of concrete. The old forms, though temporary, have been extremely rigid or have required heavy shoring. I use light forms which do not require extensive shoring and which do not have to be removed, but rather become the reinforcement for the concrete when it sets. Another object of the invention is to eliminate contact of the slab with materials touching ground and thus reduce or eliminate moisture problems.

This application is a continuation-in-part of my copending application Serial No. 505,386, filed May 2, 1955, now abandoned.

In the accompanying drawings, I have illustrated certain presently preferred embodiments of my invention, in which.

Figure 1:
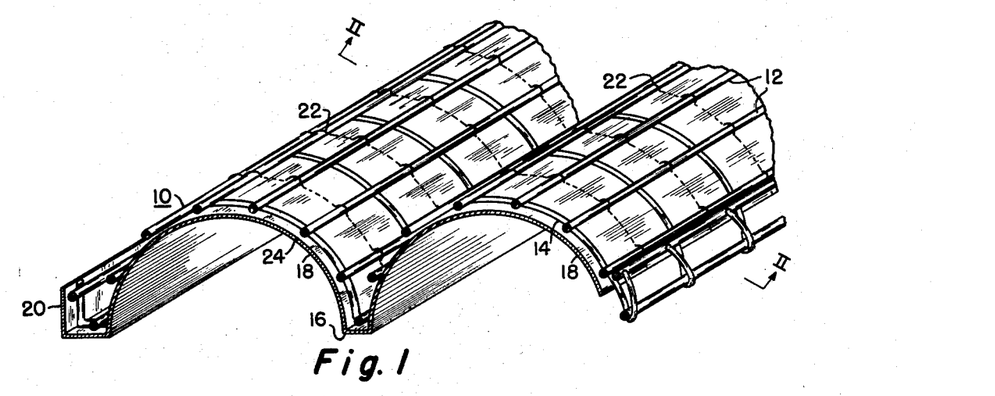
FIGURE 1 is a fragmentary perspective view of a wire mesh concrete form adapted to be integrated with cast concrete.
Figure 2:
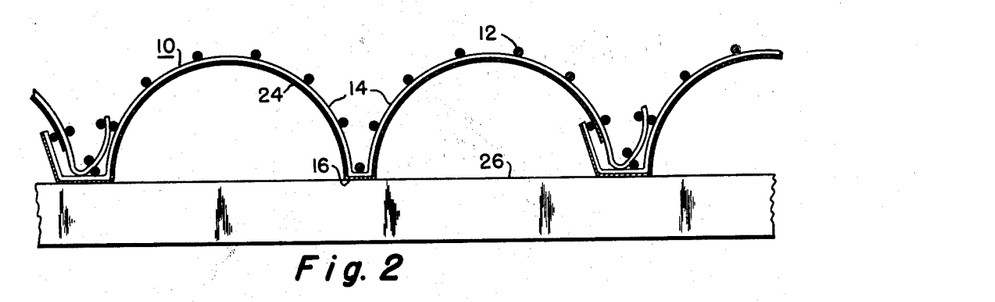
FIGURE 2 is a sectional view taken along the lines II—II of FIGURE 1.
Figure 3:
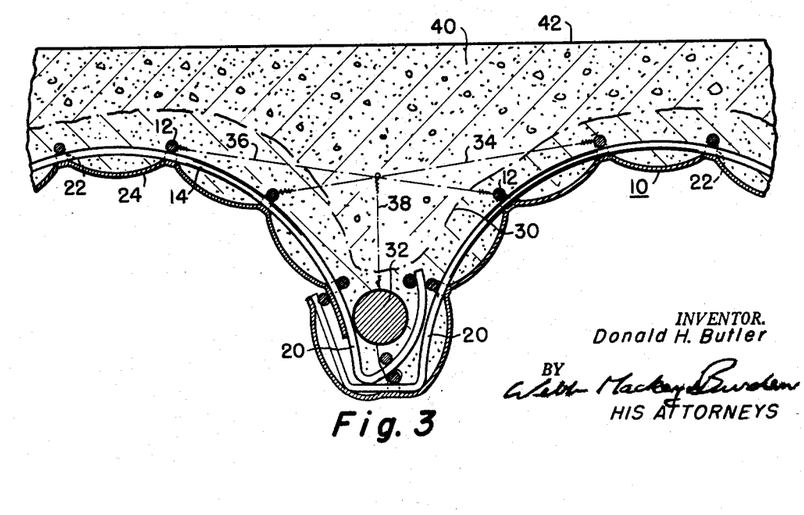
FIGURE 3 is an enlarged fragmentary view, like FIGURE 2, but with an internal longitudinal reinforcement shown and with the cast concrete shown.

FIGURES 1, 2 and 3 show one element of the concrete form which I have devised for my slab. It comprises a double-arched strip of wire mesh, generally indicated at 10, composed lengthwise of spaced-apart, longitudinally extending rods or wires 12 which may be of a length of approximately sixteen feet. The longitudinal wires 12 are spot welded at spaced-apart points therealong to a set of transverse rods or wires 14 having cusp-like midportion at 16 and having arched U-shaped opposite portions at 18 which connect the cusps. The outer extremities or buttresses of the arches 18 are reversely bent on themselves to define an upwardly open U-shaped channel, as at 20, which generally corresponds in cross-section to the upwardly open cusps at 16. The arches 18 are semicircular in form and are downwardly open. Between the transverse wires 14 is a plurality of wire metal stitching 22 which secures a backing membrane 24 to the underside of the resulting mesh 10. As shown in FIGURE 3, the stitching 22 is lose, such that the membrane 24 can be stretched away from the cross wires 14. As indicated, the resulting membrane-backed wire mesh 10 has two longitudinally extending arches generally conforming to the semicircular curvature at 18. It may be of the order of ten to sixteen feet in length and approximately 34" wide. The arches may be approximately 12½" wide and have a radius of arc of arch of 6¼" where two arches are involved. The radius of the arches and the number of the arches may vary with the length of the span. Thus, we have described one embodiment in which there are two arches, each having a radius of arc of approximately 6¼", intended for a span of 16 feet. If the span extends from 16 to 25 feet, then one arch per strip is used, and it has a radius of arc of approximately 13". For spans less than 10 feet, then three arches may be used, each having a radius of arc of approximately 4".

A plurality of the longitudinally extending strips 10 of wire mesh are arranged side by side such that their outer buttresses of the arches telescopically interfit with one another as particularly shown in FIGURES 2 and 3. Preferably, the buttress at one end of each strip is slightly narrower than the buttress at the opposite end, such that, for instance, in FIGURE 3, the inner buttress at 20 of one of the strips 14 will fit snugly within the outer buttress 20 of the other strip 14 on the right-hand side to form a common cusp. A succession of these interfitted strips 10 is laid side by side so as to foot at their opposite ends on a perimeter foundation or support, such as the supports 26, 68 or 110 in the embodiments of FIGURES 2, 5, 9 and 10.

The wire mesh elements just described are reinforced adjacent the bottom of each cusp 16 and the common cusps between two strips by a reinforcing bar 32. Cross wires 34 and 36 are connected to opposed cross wires along adjacent arches, and a wire 38, suspended from the point where the wire 34 and 36 cross, supports the reinforcing rod 32 at the proper height. The wires 34 and 36 tie the two adjacent arches together, so as to prevent them from collapsing when the wet concrete is poured into the form.

A layer 30 of concrete is poured into the cusps around the reinforcing rod 32 and entirely over the surface of the wire mesh. As noted, the stitching which supports the membrane 24 is loose so that the concrete presses the membrane away from the cross wires 14, and thereby the longitudinal wires and cross wires of the mesh become embedded in the concrete. When this concrete layer 30 sets, it holds together the reinofrcing rod and the wire mesh and provides a rather rigid structure, into which one or more additional layers of finished concrete, at 40, are poured. The finish layer is poured to a strike-off level as at 42, where it is accurately finished off and smoothed to provide a suitable surface for a floor slab. The floor slab, made in the manner as previously noted, can satisfactorily span a distance of approximately sixteen feet and may be of any suitable width, as determined by the number of strips 10 of the interfitting mesh which are used. This slab, moreover, requires much less concrete than would be required for a similar sized slab poured on grade in the conventional manner.

Figure 4:
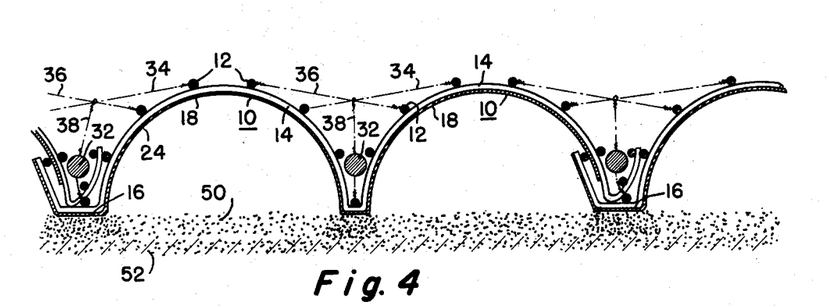
FIGURE 4 corresponds to FIGURE 2 and shows one method of supporting my form prior to pouring concrete.

It should be noted that the wire mesh element and the reinforcing rod, when tied together still do not have sufficient strength to support the wet concrete when first poured. The forms must be supported along their lengths. FIGURE 4 shows one method of support. In FIGURE 4, the adjacent strips of wire mesh 10 are interfitted to provide a common cusp, as at 16, as previously set forth. The strips are laid on top of approximately a two-inch layer 50 of loose dirt, which, in turn, is supported on solid earth at 52. After the concrete shell has been cast and has set, the two-inch layer of loose dirt is washed out with a hose, leaving about a two-inch high air space in the area under the slab. The construction of FIGURE 4 is particularly useful for concrete slabs cast on the ground used in the so-called utility or basementless houses.

Figure 5:
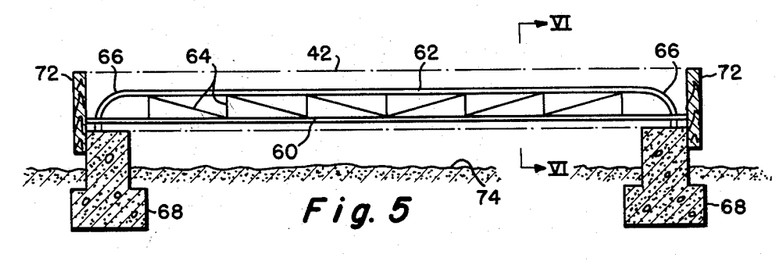
FIGURE 5 shows an internally trussed modification of the internal reinforcement in side elevation.
Figure 6:
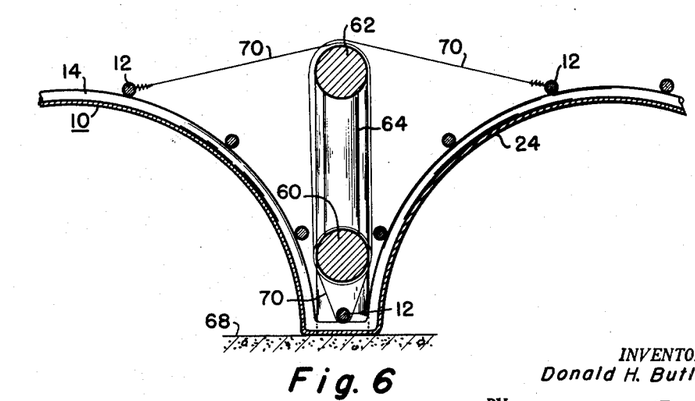
FIGURE 6 is a transverse cross-sectional view taken along the lines VI—VI of FIGURE 5 and corresponding generally to the showing of FIGURE 2.

In FIGURES 5 and 6, an internally trussed modification of the internal reinforcing bars is shown which requires no vertical support except at the ends of the internal trusses. Each truss has a longitudinally extending beam-like form, including a lower tension member or chord 60 and a vertically aligned upper compression member or chord 62. The tension and compression chords 60, 62 are secured together in conventional fashion, by means of vertical and diagonal rods 64 in plane therewith. Each truss extends longitudinally of the strip forms 10 and, together with the other trusses, is disposed in a vertical plane within each of the upwardly open cusps. The opposite ends of the top chord 62 are bent outwardly and downwardly, at 66, so as to rest upon a concrete or other footing, as provided at 68. Tie wires or members 70 are provided at intervals along the length of the truss and each has its ends secured to longitudinal wires 12 of the wire mesh and is looped downwardly and about the bars 60 and 62 and another longitudinal wire 12 in the mesh at the bottom of the cusp. The truss serves as an unbending beam member which, through the medium of the tie wires 70, supports the form strips 10 so as to prevent appreciable sagging or bellying thereof. At the same time, the tie wires give lateral support to the truss. The form strips 10 are continuous, that is, a single width of a form strip is bent to form both one or more cusps and the arches which act as connecting portions between the cusps. Thus, the tie wires or members 70 pass over the compression member 62 and are connected at their ends to the upper portions of the cusps to suspend said cusps and connecting portions from said upper chords.

Referring to FIGURES 5 and 6, it can be seen that the bar 62 of the truss is above the arches of the wire mesh so that planks can be placed across the bars for walkways from which concrete can be poured. The trusses, after the concrete pouring operation, are disposed somewhat below the surface 42 of the top layer of the concrete which is smoothed off so as to conform to a set of rectangular edge forms, as at 72, conventionally used in confining the concrete. It is to be noted in FIGURE 5 that an accurately spaced and adequate air space is provided beneath the cast slab and the earth 74, from which the slab is spaced by reason of the inherent beam strength of the internal truss just noted. This structure is also useful over basements and in multistory buildings.

Figure 7:
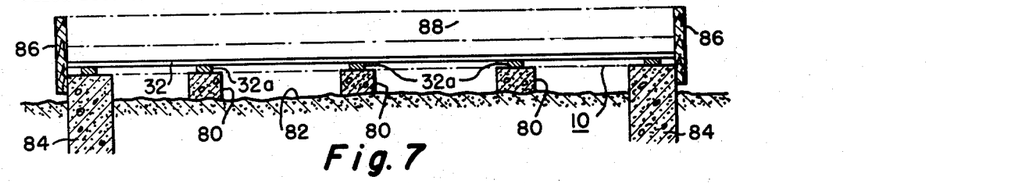
FIGURES 7, 8, 9 and 10 are views showing further modified external supporting members for the wire mesh forms and their internal reinforcements.
Figure 8:
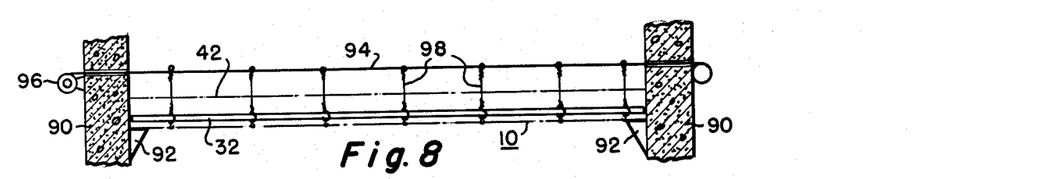
Figure 9:
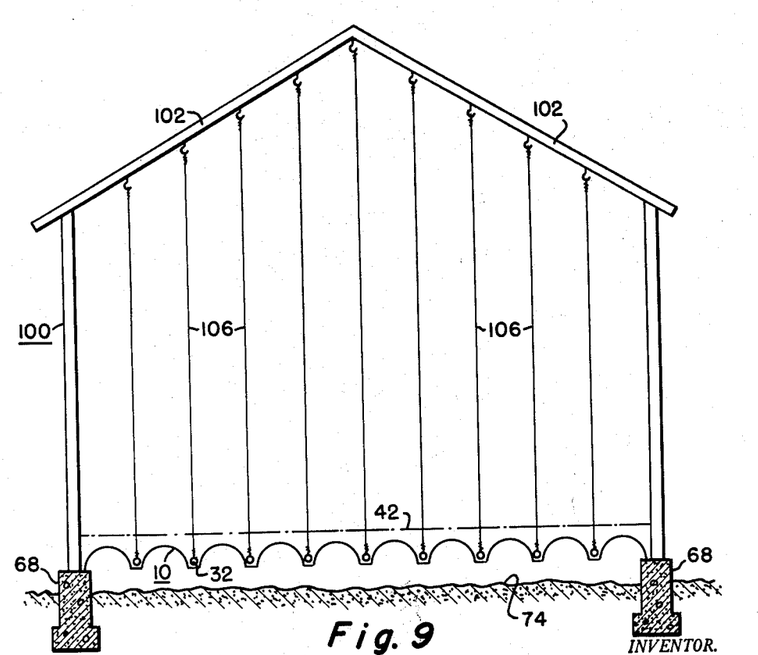

FIGURES 7, 8, and 9 show other ways of supporting the forms above the ground and along their lengths without using a truss such as is shown in FIGURES 5 and 6. In FIGURE 7, several transverse concrete leveling courses 80 rest on the ground 82 and, along their upper surfaces, support the underside of the cusps of the strips 10 laid side by side between a pair of footings 84. The longitudinal reinforcing bars 32 are supported by blocks 32a which are placed inside the strips 10 but are supported by the leveling courses 80 and the footings 84. Although not shown in the drawings, the cross wires 34 and 36 are spaced along the strips at and between the blocks 32a. The bar 32 has sufficient rigidity over the spans between the blocks 32a to prevent the strips from sagging in the otherwise unsupported areas. External concrete forms 86 may be provided for receiving the concrete 88 poured into the form strips 10, which are, in turn, supported on the leveling courses 80.

In FIGURE 8, another externally supported form is shown, in which a pair of opposed vertically extending concrete walls 90 are shown having inwardly opposed angle brackets 92 supported thereby. A tension wire 94 is arranged between the walls 90 and is placed under tension by means of a suitable reel tensioning mechanism 96 carried by the walls 90. At spaced-apart points along the tension member 94, which may be wire, depending tie wires 98 are provided which encircle and support a longitudinally extending reinforcement member 32 disposed in the cusps of a wire mesh form composed of the form strips 10. Each of the form strips 10 is tied in its intermediate portion to the reinforcing rod 32, much in the manner of the tension rod 60 of the embodiment of FIGURE 6, and, at the opposite ends, the strips rest in the brackets 92. The finish concrete is cast to the level indicated at 42, FIGURE 8, upon the membrane-backed wire mesh form, and thereafter the depending tie wires 98 are severed along the line 42 when the concrete is hardened sufficiently so as to be self-sustaining. Thereafter, the tension wire 94 and the tensioning mechanisms are removed. A slack wire can be used instead of the tension wire 94, in which case the vertical wires 98 are varied in length to keep the reinforcing member 32 level.

FIGURE 9 shows a modification useful in much the same circumstances as the internally trussed embodiment of FIGURE 5, but the modification of FIGURE 9 employs external supports rather than internal trusses. In FIGURE 9, the footings 68, which may be of concrete, are set in the ground 74 and thereafter a wooden or other structure, such as at 100, is framed in so as to provide an overhead structure, as at 102, formed by means of diagonally butted roof supports. At spaced-apart points along the roof supports 102, a plurality of depending tension wires 106 are suspended and, at their lower ends, the wires carry longitudinal reinforcing members 32. The longitudinal reinforcing members 32 are received in the cusps of sets of wire mesh strips 10 disposed side by side and suspended from the reinforcing rod 32, in the same general manner as the suspension between the tension member 60 and the longitudinal wire 12 of the embodiment of FIGURE 6. No further external supports are required according to the showing of FIGURE 9 and, as soon as the subsequently cast concrete has hardened along the level 42 so as to be self-sustaining, the wires 106 are severed along the level 42 so as to produce an unobstructed continuous concrete slab floor.

Figure 10:
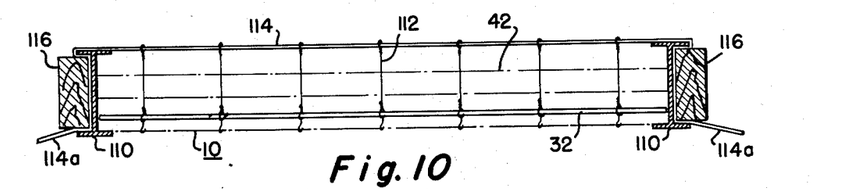

In FIGURE 10, a modified form of the invention is shown, useful in multiple story floor constructions generally after the fashion of the modification of FIGURE 8. A pair of spaced-apart I beams 110 are shown, which extend transversely to the endwise extending form strips 10. The form strips 10 are tied to a longitudinal reinforcing member or bar 32 in its cusps and the bar 32 in turn is secured to a set of suspended wires 112 which hang from a horizontally disposed tension member 114, which also may be a wire. The tension member 114 is drawn at its opposite ends across the outer edges of the I beams 110 and is reversely bent on itself, as at 114a, and is wedged within the outer outwardly open channel of the I beam and frictionally held by a block 116 of wood or the like, or it may be otherwise tensioned. Thus, the tension member 114 is maintained in a substantially horizontal plane under tension so as to support the reinforcing rod 32 in a similar plane. Concrete is cast in between the I beams and over the wire mesh strips 10 to a level, as indicated at 42, and after the concrete has hardened and this become self-sustaining, the depending wires 112 are severed at the concrete level and the tension member 114 is released and removed after the blocks 116 are removed. Slack wire supports may also be used, as described with reference to FIGURE 8.

Figure 11:
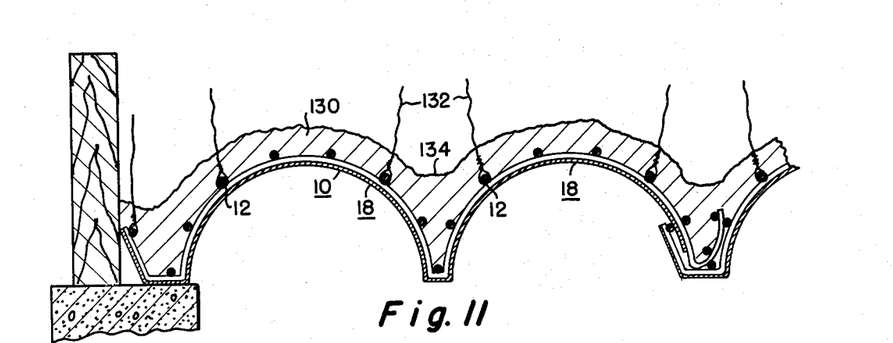
FIGURES 11 and 12 show a modification of the invention as built up in a sequence of two steps of casting.
Figure 12:
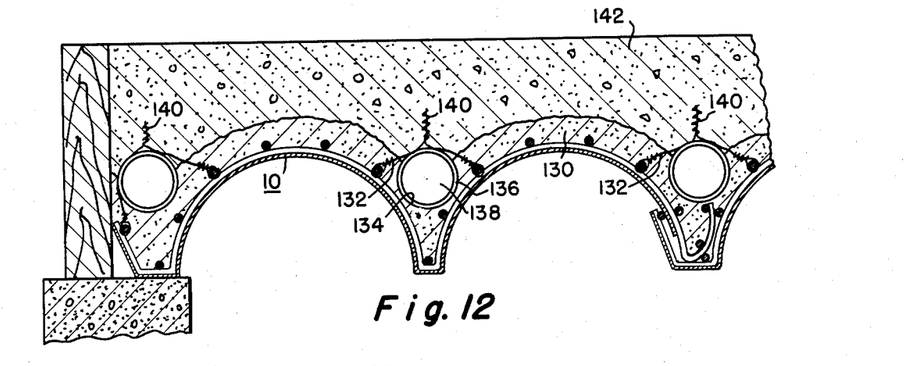

In the modification of FIGURES 11 and 12 of the invention, the form strips 10 are integrated into a unitary shell structure by reason of having a shell of prime concrete, as at 130, poured thereover and hardened, which is of low weight, high strength, and low thermal conductivity. This characteristic is given to the concrete by using perlite, for instance, as its aggregate, the perlite being a poor conductor of heat and being relatively light in weight compared with most other known commercial aggregates. A high density cement paste is used to provide strength to the concrete. This prime layer 130 of low heat conductive concrete integrates with the mesh 10 to provide a self-supporting shell, prearranged in the vicinity of its cusps to have a plurality of concrete embedded tie wires 132 secured at their lower ends to the longitudinal wires 12 of the mesh and having their upper ends extending upwardly through the surface of the shell 130 so as to present a tying portion free thereof. The shell 130 is convoluted both at its upper and lower surface, in the same manner as the preceding embodiments of the invention, and it generally conforms with the semicircular arches, as at 18, and with the cusps between the successive arches 18. The convolutions in the upper surface, similarly to the convolutions in the lower surface, effectively provide a series of longitudinally extending peaks and valleys. Into each of the valleys in the upper surface, as at 134, either while the layer is slightly soft or else firm and set up, there is laid a tubular reinforcement 136, preferably having porous or reticulated walls provided, for instance by the use of material such as expanded metal. The pores or openings in the expanded wire tube 136 are of large enough size to receive a surface of concrete therein to block the same, but are, at the same time, small enough to prevent the seepage or leakage of much concrete therethrough and thereby provide a hollow interior 138 of the reinforcing member 136. Thus, if the layer 130 is slightly soft, the pores in the tube 136 are bridged over and sealed off by the prime concrete.

The tie wires 132, which are secured as noted to the longitudinal wires 12 adjacent each of the cusps, are tied together, as at 140, across the tops of the reinforcements 136 for firmly holding each of the same in the valley 134 in which it is located. The expanded metal tube 136, when tied to the wire mesh, reinforces the mesh and forms a hot air duct by which the slab may be heated.

Thereafter, one or more layers of finish concrete, as at 142, are cast over the self-sustaining concrete shell and about and along the longitudinal length of the porous walled reinforcing tubes 136. The finish concrete is preferably of a high density, high thermally conductive composition having an aggregate therein of considerably different properties from the perlite previously considered. This finish layer of concrete 142 is relatively "dry" as cast, so as to have a viscosity high enough to close off the openings in the side of the expanded metal tube 136 without unduly penetrating and leaking therethrough so as to block off the hollow interior 138 thereof.

Hot air introduced into the hollow interior 138 of the reinforcing tubes at either of the open ends thereof will cause the conductive concrete layer 142 to heat up to produce radiant heating in the floor space thereabove, whereas the insulative layer 130 prevents heat losses to the area below the concrete slab which may be a basement or which may be the ground surface. Regardless of this additional function, however, as a hot air conduit or conductor, the expanded metal tube 136 serves as a sturdy and effective reinforcing member for the concrete shell 130 while the finish layers 142 of concrete are setting up and hardening in integrated fashion therewith. Thereafter, the tube 136 is a permanent internal longitudinal reinforcement. The bond between the reticulations of the expanded metal tube 136 and the concrete is especially effective after the hardening of the upper layer 142 of concrete so as to unify the constituents into a strong and rigid floor slab construction.

Figure 13:
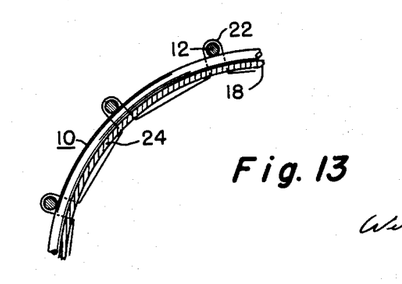
FIGURE 13 is a fragmentary cross-sectional showing of the mesh of the preceding figures.

In FIGURE 13, a manner of stitching the stitching wire 22 to the membrane 24 is shown which is suitable for use with the wire meshes 10 of any of the embodiments of the inventions. The wire stitching 22 is formed of a continuous length of stitching wire which zigzags back and forth about the longitudinal wires 12 of the mesh and through suitable needle openings formed in the membrane 24, such that, when the prime layer of concrete is cast, the membrane 24 is forced against the stitching 22 so as to belly out and effectively flute along the insides of the arches 18. The membrane 24 may be of any suitable material for backing up the mesh to prevent the concrete from escaping from the form, and is preferably waterproof paper. The resulting paper-backed strips of wire mesh 10, therefore, provide their own cement form as it were, and, other than for the external shoring of certain of the modifications which must be removed, there is no further effort that has to be made after the hardening and setting process by way of removing flooring or shored flooring beneath the slab.

As herein disclosed, the invention is shown embodied in a concrete floor or ceiling slab using paper-backed wire mesh which becomes embedded in the concrete. Other foraminous materials can be used, for example, expanded metal which will likewise become embedded in the concrete.

FIGURES 14–17 show a modification of the slab construction shown in FIGURES 5 and 6 in which solid sheet metal is substituted for the wire mesh used in the structure shown in FIGURES 5 and 6. This modification has advantages in certain applications, for example, when a ceiling is required which is more attractive in appearance than the ceiling produced by the structure of FIGURES 5 and 6. The use of the steel sheet also saves concrete and reduces the overall weight of a building. The construction is otherwise the same in principle as the slab construction shown in FIGURES 5 and 6.

Figure 14:
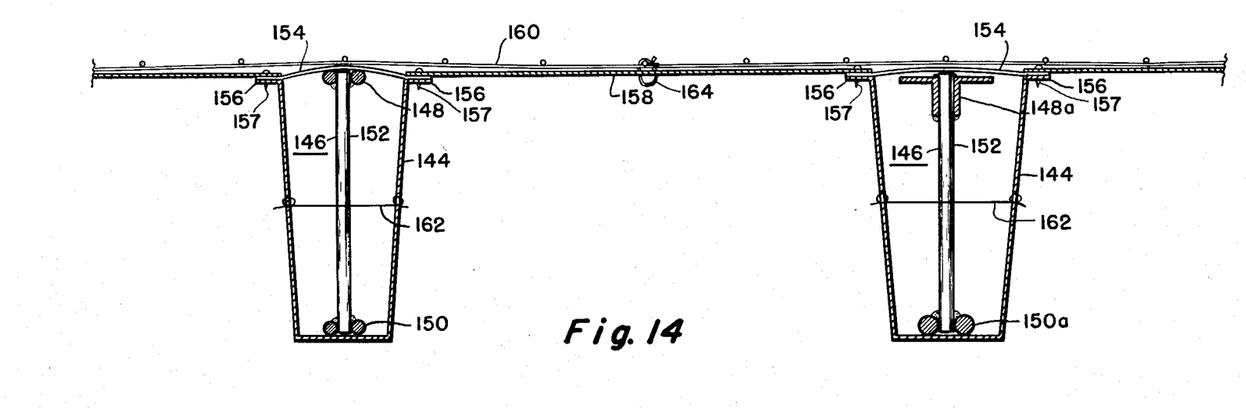
FIGURES 14-17 show another modification of my invention, FIGURES 14, 16 and 17 being transverse sections showing the modified slab form and two stages of pouring concrete and FIGURE 15 being a side view of a truss used in the modified slab construction.
Figure 15:
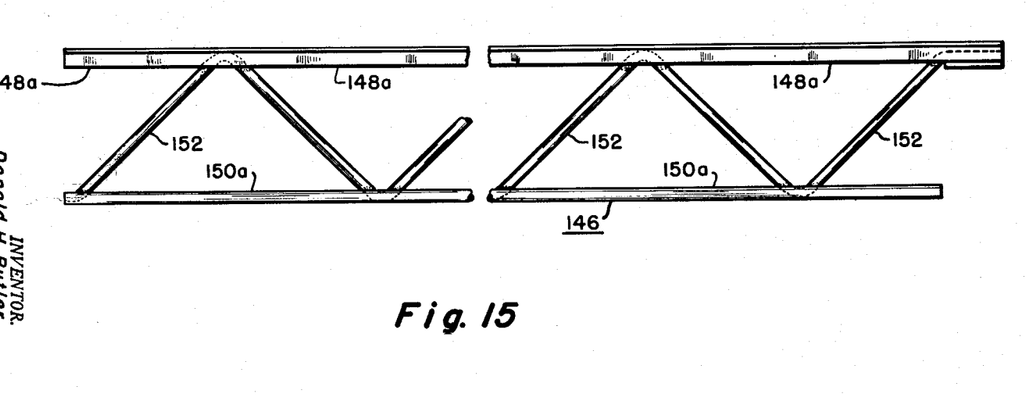

FIGURE 14 is a transverse section of the modified form of slab construction prior to the pouring of concrete. As in the structures of FIGURES 5 and 6, the bottom of the slab has downwardly extending cusps which are spaced from each other along the width of the slab and extend parallel to each other across the length of the slab. The forms for the cusps of the slab are made of bendable sheet material which is impervious to the flow of concrete, for example, steel sheet which is bent to form troughs 144 which extend the full length of the distance to be spanned. The sheet metal may be 24, 26, or 28 gauge sheet, the thickness of the sheet being determined by the depth of the troughs and the amount of concrete which will be poured into them as is described later. These troughs are suspended from trusses 146 which extend the full length of the troughs 144 and have top chord compression members 148 or 148a and bottom chord tension members 150 or 150a secured to each other by webbing 152 (see FIGURE 15). The top chord of each truss is in substantially the same plane as the top of the cusp in which it is positioned, and the bottom chord of each truss is adjacent the bottom of the cusp. FIGURE 14 shows two alternate forms of trusses in which the compression members 148 in the left-hand cusp are in the form of round bars and the members 148a in the right-hand cusp are angles. In the left-hand cusp, the tension members 150 are rods and, in the right-hand cusp, the tension members 150a are also rods, but larger in diameter than the tension members in the left-hand cusp. A truss of the type shown in the right-hand cusp is used where a heavier load or a greater span is encountered than a truss of the type shown in the left-hand cusp.

The troughs 144 are suspended from the trusses by reinforcing mesh 154 which extends across the tops of the trusses and the length of the trusses and are secured to outwardly bent flanges 156 at the top of each side of the troughs. Sheets 158 of the same material from which the troughs are made are also secured to opposed flanges 156 of adjoining troughs to provide forms for the portions of the slabs between cusps and to form connecting portions between the upper portion of the cusps. The troughs, reinforcing mesh and sheets may be secured to each other by metal screws 157. The mesh 154 provides tie members which extend over the upper chord of each truss and connect to the upper portions of the cusps formed by the troughs 144 to suspend said cusps and connecting portions 158 from said upper chords.

Conventional concrete reinforcing mesh 160 is then placed across the tops of the cusps and across the sheets 158, as shown in FIGURE 14. Tie wires 162 extend across in the inside of the troughs at a point approximately one half their depth and are tied to the sides of the trough so as to prevent the sides from bulging outwardly when concrete is poured into them. Tie wires 164 connect the sheets 158 and the reinforcing mesh at points midway between the cusps and at intervals across the sheets.

Figure 16:
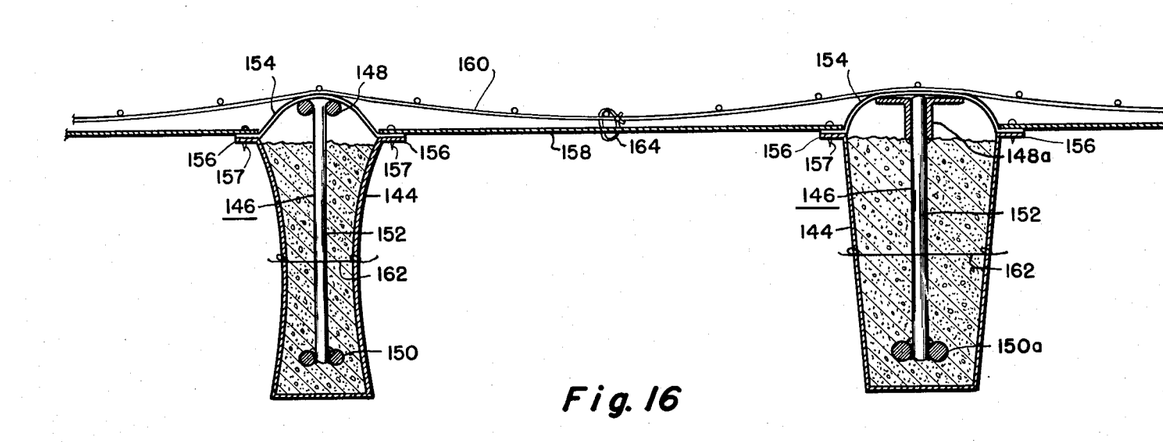

The structure just described does not have sufficient strength to support the weight of concrete necessary to form the finished floor. Accordingly, as previously described in connection with other modifications, the concrete is poured in two stages. In the modification shown in FIGURES 14-17, sufficient concrete is poured in the first stage to fill each of the troughs 144 substantially to their open ends but beneath the upper chords 148 and 148a, as shown in FIGURE 16. The weight of this first pour of concrete causes the troughs 144 to drop downwardly away from the trusses 146. They are held from further downward movement by the reinforcing mesh 154 and by the metal sheets 158. The reinforcing mesh 154 is flexible and thus the troughs 144 filled with concrete are able to exert tension forces on the reinforcing mesh 154 and tension forces in the opposite direction on the connecting sheets 158. These tension forces provide lateral stability to the compression members 148. Therefore, these compression members can be made with less lateral strength than they would otherwise require to support the concrete which is first poured into the troughs. At the same time, the concrete in the troughs forms with the trusses 146, the troughs 144, wire mesh 154 and sheets 158 a composite integrated structure or body which, when the concrete has been set, has sufficient strength to be self-supporting and to withstand the weight of a second pour of concrete.

Figure 17:
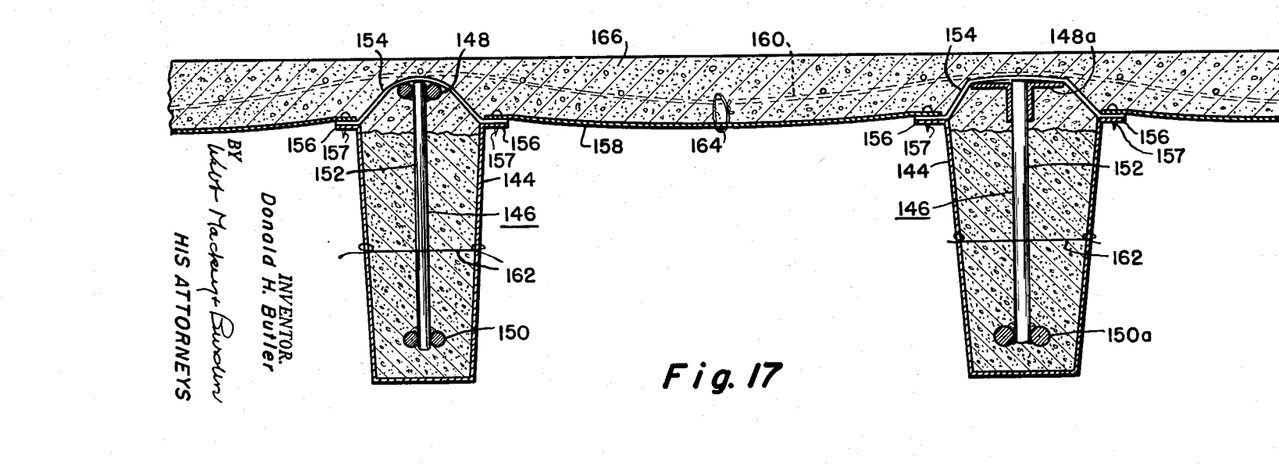

FIGURE 17 shows the finished floor in which the second layer 166 has been poured over the first pour within the troughs 144 and over the sheets 158 which span the space between the cusps. As shown in FIGURE 17, sufficient concrete is poured in the second stage so as to cover the reinforcing mesh 154. Preferably, the concrete above the tops of the trusses has a minimum depth of one inch to provide adequate fire protection to the truss. It will also be noted from FIGURE 17 that the tie wires 164 between the reinforcing mesh 160 and the sheets 158 assist the sheets in withstanding the weight of the concrete which is poured over them. If desired, the side walls of the troughs 144 can be pulled inwardly (as shown in the left-hand cusp in FIGURE 16) to reduce the amount of concrete which is poured around the trusses 146. However, the side walls should be pulled inwardly towards each other only so far as to still provide at least an inch of concrete between the tension members 150 and the sides of the troughs 144 so as to provide fire protection for the trusses. If this limitation is maintained, the composite structure will have sufficient strength to support the concrete poured in the second stage and at the same time there is a substantial saving in concrete.

As is known, compression members of reinforcements used in the construction of concrete slabs perform no useful function after the slab has been poured and the concrete has set. They are required only to support the form and the concrete before the concrete has set. In my form of slab construction, the compression members of the reinforcing truss do not have sufficient lateral strength to withstand the static and kinetic loads incident to the pouring of the first stage of concrete. As has been explained, lateral stability is provided to the compression members by the weight of the concrete transmitted by the tension members, i.e., the reinforcing mesh 154 and the sheets 158. I thus am able to reduce the amount of steel in a member which is simply dead weight in the finish concrete slab. It has been estimated that, if a building is constructed using my method of slab construction, approximately 20% of the weight of the steel used in conventional slab construction can be saved.

Forms such as those shown in FIGURE 14 can be made of lightweight materials and are easier to assemble in the field than prior concrete forms. Moreover, no temporary support or shoring is required.

While I have described certain presently preferred embodiments of my invention, it is to be understood that it may be otherwise embodied within the scope of the appended claims.

I claim:

1. An interrupted stage method of producing a monolithic slab with sufficient beam strength to be self-supporting and having its bottom surface in the form of a plurality of downwardly extending cusps spaced from each other across the bottom surface and extending parallel to each other the length of the slab; comprising
    A. supporting a series of parallel trusses on suitable end supports, said trusses,
        (1) each having a top chord and a bottom chord,
        (2) each truss being positioned in a cusp of bendable sheet material impervious to the flow of concrete with said bottom chord adjacent the bottom of the cusp and with said top chord in substantially the same plane as the top of the cusps,
        (3) with connecting portions of said sheet material extending between the upper side portions of adjacent cusps,
        (4) and with a series of tie members extending over said upper chord of each truss and connected at their ends to the upper portions of the respective cusp to suspend said cusps and connecting portions from said upper chords;
    B. pouring concrete to a partial depth in each of said cusps with the upper surface thereof below said upper chord, whereby the weight of said concrete will pull said tie members downwardly on each side of said truss to tension the tie members and connecting portions of said sheet material between said cusps, thereby providing lateral stability to said truss;
    C. allowing said concrete to set so as to form an integrated body comprising said bendable sheet material, the concrete, the trusses and said tie members; and
    D. pouring additional concrete until the desired slab thickness is obtained.

2. An interrupted stage method of producing a monolithic concrete slab as described in claim 1 in which said bendable sheet material impervious to concrete from which said cusps and said connecting portions are formed is continuous and reticulated.

3. An interrupted stage method of producing a monolithic concrete slab as described in claim 1 in which
    A. said cusps of bendable sheet material are in the form of troughs positioned so that they open upwardly, B. in which said connecting portions are formed separately from said troughs, and C. in which said connecting portions are secured to the top of each side of said troughs.

References Cited in the file of this patent

UNITED STATES PATENTS

| | | |
|---|---|---|
| 470,901 | Sears | Mar. 15, 1892 |
| 716,838 | Grant et al. | Dec. 23, 1902 |
| 787,512 | Himmelwright | Apr. 18, 1905 |
| 1,183,594 | Robinson | May 16, 1916 |
| 1,796,851 | Macomber | Mar. 17, 1931 |
| 2,096,629 | Farrar et al. | Oct. 19, 1937 |
| 2,251,499 | Pelton | Aug. 5, 1941 |